(12) United States Patent
Kobayashi et al.

(10) Patent No.: US 8,020,462 B2
(45) Date of Patent: Sep. 20, 2011

(54) BALL SCREW/NUT TYPE LINEAR ACTUATOR

(75) Inventors: Kiyoto Kobayashi, Nagano (JP); Akihiro Yokoyama, Nagano (JP)

(73) Assignee: Harmonic Drive Systems, Inc., Tokyo (JP)

( * ) Notice: Subject to any disclaimer, the term of this patent is extended or adjusted under 35 U.S.C. 154(b) by 1041 days.

(21) Appl. No.: 11/886,215

(22) PCT Filed: Apr. 22, 2005

(86) PCT No.: PCT/JP2005/007723
§ 371 (c)(1), (2), (4) Date: Sep. 12, 2007

(87) PCT Pub. No.: WO2006/114884
PCT Pub. Date: Nov. 2, 2006

(65) Prior Publication Data
US 2008/0190226 A1    Aug. 14, 2008

(51) Int. Cl.
*F16H 1/24* (2006.01)
*F16H 55/02* (2006.01)
(52) U.S. Cl. .................................. 74/424.81; 74/89.23
(58) Field of Classification Search ........... 74/89, 89.23, 74/89.34, 424.71, 424.81, 424.82
See application file for complete search history.

(56) References Cited

U.S. PATENT DOCUMENTS

| 4,455,838 | A | * | 6/1984 | Junichi et al. | 60/711 |
| 5,689,994 | A | * | 11/1997 | Nagai et al. | 74/89.32 |
| 2005/0253469 | A1 | * | 11/2005 | Hochhalter et al. | 310/80 |
| 2009/0056485 | A1 | * | 3/2009 | Kobayashi et al. | 74/22 R |

FOREIGN PATENT DOCUMENTS

| JP | 59-34469 | 3/1984 |
| JP | 62-258258 | 11/1987 |
| JP | 02-231939 | 9/1990 |
| JP | 03-60862 | 6/1991 |

OTHER PUBLICATIONS

International search Report dated Jun. 9, 2005 (2 pages).

* cited by examiner

*Primary Examiner* — Justin Krause
(74) *Attorney, Agent, or Firm* — Flynn, Thiel, Boutell & Tanis, P.C.

(57) ABSTRACT

A ball screw/nut type linear actuator (1) where a ball nut (32) moves in forward-backward directions by rotation of a ball screw shaft (31) connected to a motor (22), wherein the ball screw shaft (31) is connected and fixed, in a small diameter hollow section (22c) of the motor shaft (22), to the motor shaft so that a part of the locus of the movement of the ball nut (32) also enters into a large diameter hollow section (22a) of the motor shaft (22). The construction eliminates the need of a coupling for connecting the motor shaft (22) and the ball screw shaft (31) and enables the ball screw shaft (31) to be supported together with the motor shaft (22) by bearings (27, 28) of the motor. As a result, a support bearing for supporting the ball screw shaft can be eliminated. Thus, a short and light linear actuator is realized.

4 Claims, 2 Drawing Sheets

BALL SCREW/NUT TYPE LINEAR ACTUATOR

TECHNICAL FIELD

The present invention relates to a linear actuator having a short shaft length, where a ball nut moves in a reciprocatory manner along a ball screw connected to a motor shaft by rotation of the ball screw.

BACKGROUND ART

Ball screw/nut type linear actuators comprising a ball screw/ nut mechanism and a motor are known as one type of linear actuator.

FIG. 2 is a schematic vertical cross-sectional view showing a typical ball screw/nut type linear actuator. In the ball screw/nut type linear actuator 100 as shown in the drawing, a ball screw shaft 102 is connected and fixed to a motor shaft 101 in a coaxial state, a ball nut 103 which is screwed onto a ball screw shaft 102 is held in a non-rotating state, and the rotating of the ball screw shaft 102 rotates causes the ball nut 103, which is connected to a load, to move in a forward-backward direction along the ball screw shaft 102.

It is usual for the motor shaft 101 and the ball screw shaft 102 to be connected and fixed via a coupling 104. Accordingly, a motor 105, the coupling 104, the ball screw shaft 102, and a ball screw shaft support bearing 106 are serially arranged in the direction of the shaft line. Consequently, conventional ball screw/nut type linear actuators 100 have problems that they have a long shaft length and are heavy due to need to have the coupling 104, support bearing 106, and other components.

DISCLOSURE OF THE INVENTION

It is an object of the present invention to propose a short and light ball screw/nut type linear actuator.

In order to achieve the abovementioned object, the ball screw/nut type linear actuator of the present invention is characterized in comprising a motor, and a ball screw/nut mechanism; wherein a ball screw shaft of the ball screw/nut mechanism is connected and fixed in a coaxial state to a motor shaft of the motor;

a ball nut of the ball screw/nut mechanism is held in a non-rotating state, and is able to move in a reciprocatory manner along the ball screw shaft as the ball screw shaft rotates;

the motor shaft is a hollow shaft; and the ball screw shaft is connected and fixed to the motor shaft inside the hollow section of the motor shaft.

In the ball screw/nut type linear actuator of the present invention, the motor shaft is a hollow shaft, and a ball screw shaft is connected and fixed in a coaxial state to the motor shaft within a hollow section thereof. The shaft can accordingly be made shorter than conventional linear actuators of the same type that have the motor shaft, coupling, and ball screw shaft in a serial arrangement.

The ball screw/nut type linear actuator of the present invention is characterized in that the ball screw shaft comprises a main component in which a ball screw is formed, and a connection shaft component integrally formed in a coaxial state on a rear end of the main component;

the motor shaft comprises a first hollow shaft section in which a rear end section of the main component of the ball screw shaft is inserted in a coaxial state, and a second hollow shaft section in which the connection shaft component of the ball screw shaft is inserted in a coaxial state;

the first hollow shaft section has an inside diameter dimension allowing the ball nut to move;

and a connection shaft section of the ball screw shaft is connected and fixed to the second hollow shaft section.

The connection shaft section is formed integrally with the ball screw shaft, and the connection shaft section is directly connected and fixed to the second hollow section of the motor shaft, whereby the need for a coupling is eliminated. As a result, a reduction in weight of the ball screw/nut type linear actuator can be realized along with a shorter shaft length.

In this case, in order to increase the strength of the connection between the motor shaft and the ball screw shaft, it is preferable for the connection shaft component of the ball screw shaft to penetrate the second hollow shaft section of the motor shaft, and for a retainer to be attached to the distal end of the connection shaft component protruding from the rear end of the second hollow shaft section of the motor shaft.

The ball screw/nut type linear actuator of the present invention is further characterized in comprising first and second bearings that support the motor shaft in a rotatable state; wherein the first bearing supports a front end section of the first hollow shaft section of the motor shaft in a rotatable state;

the second bearing supports a front end section of the second hollow shaft section of the motor shaft in a rotatable state;

a motor rotor is incorporated into an outer peripheral surface of the first hollow shaft section, which is positioned between the first and second bearings, and a motor stator is disposed in a state of surrounding the motor roller.

The front and rear ends of the hollow motor shaft to which a rear side component of the ball screw shaft is connected and fixed are supported. As a result, a support bearing for supporting the rear end component of the ball screw shaft in a rotatable state can be eliminated. A shorter shaft length and dramatic reduction in weight can be realized as a result.

BEST MODE FOR CARRYING OUT THE INVENTION

A description is provided hereunder of one example of a ball screw/nut type linear actuator to which the present invention has been applied, with reference to the accompanying drawings.

Figures 1A, 1B:
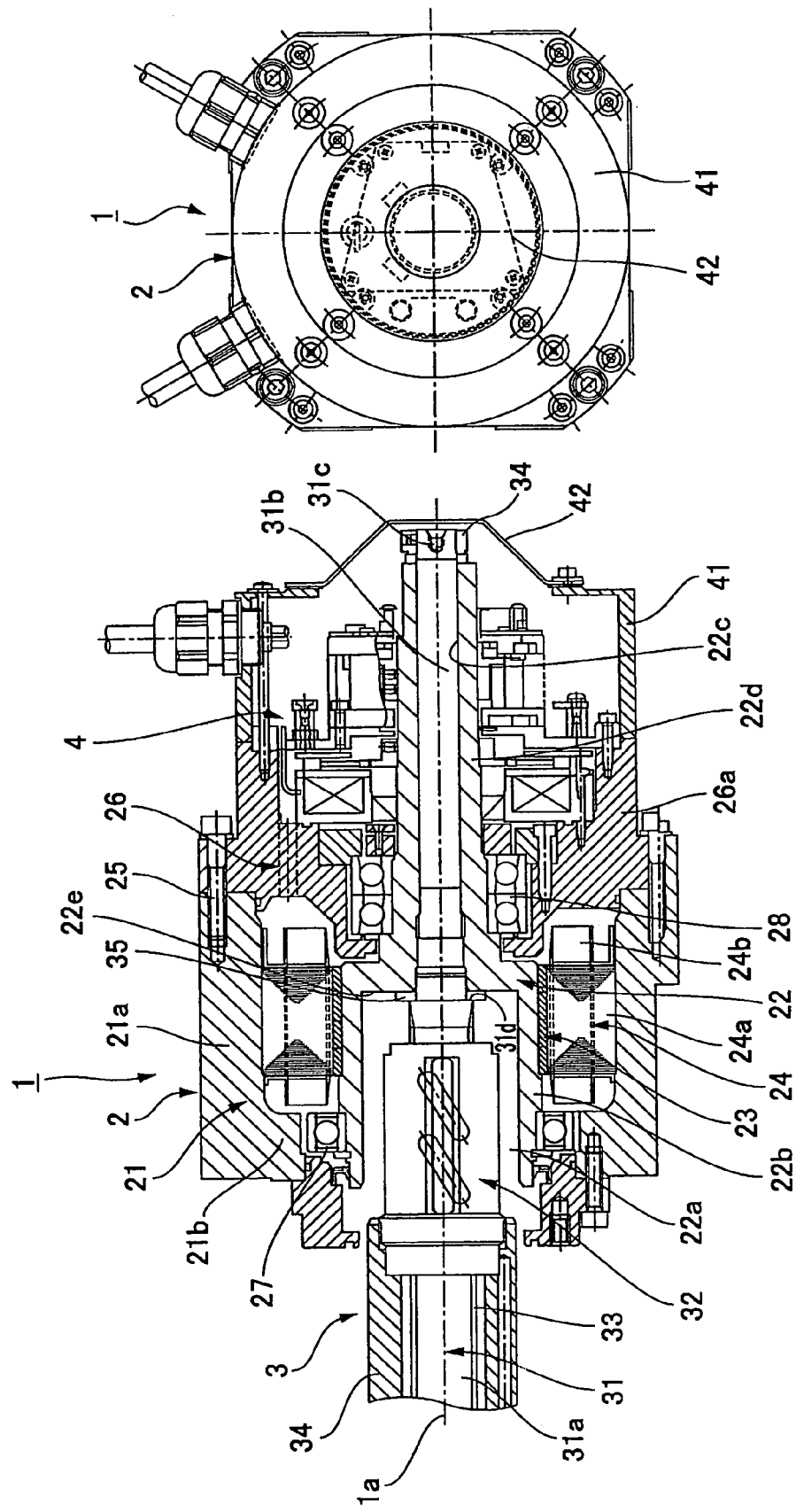
FIG. 1(A) is a vertical cross-sectional schematic view showing one example of a ball screw/nut type linear actuator to which the present invention is applied.
FIG. 1(B) is an end view showing a rear end surface thereof.
Figures 2A, 2B:
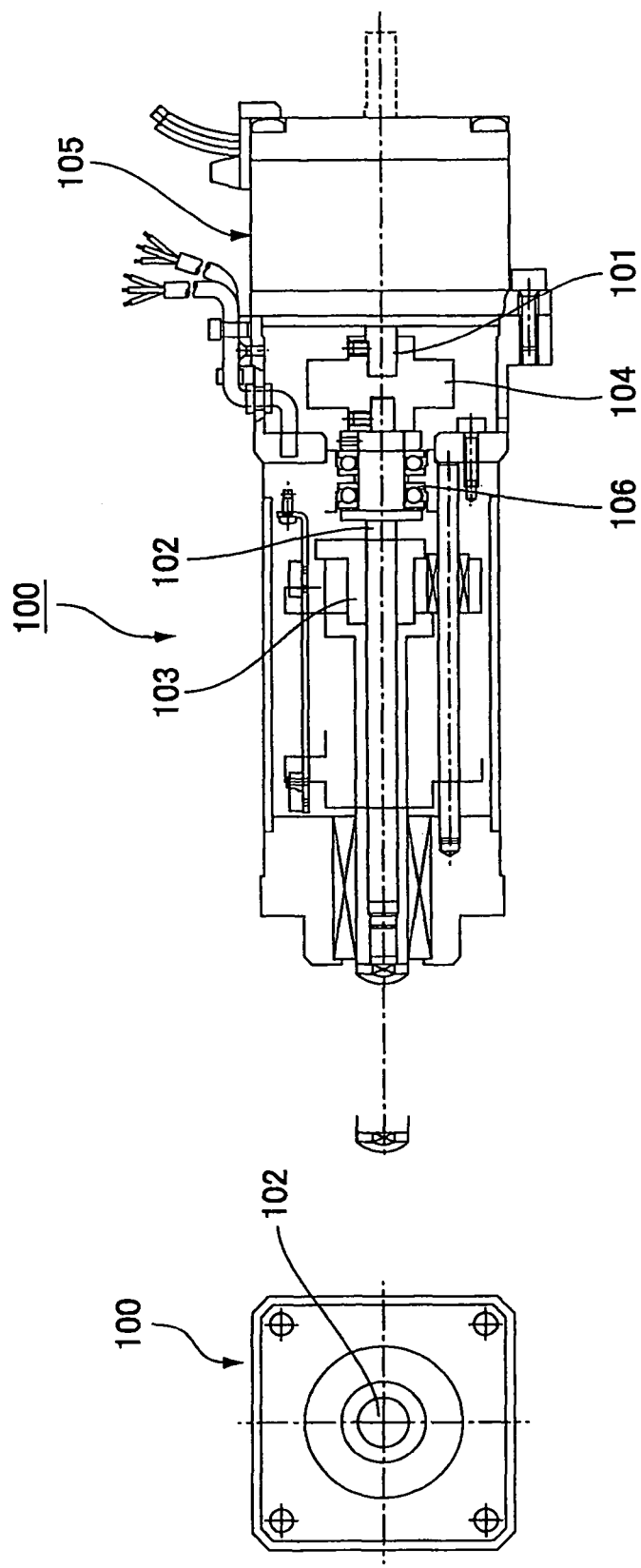
FIG. 2(A) is a vertical cross-sectional schematic view showing one example of a conventional ball screw/nut type linear actuator.
FIG. 2(B) is an end view showing a front end surface thereof.

FIG. 1(A) is a vertical cross-sectional schematic view showing a ball screw/nut type linear actuator of the present example, and FIG. 1(B) is an end view showing a rear end surface thereof A ball screw/nut type linear actuator 1 has a motor 2 and a ball screw/nut mechanism 3 connected to the front of the motor 2 in a coaxial state. A detecting section 4 is incorporated into the rear of the motor 2.

The motor 2 comprises a cylindrical motor housing 21 and a motor shaft 22 disposed concentrically on the inside of the motor housing 21 in a rotatable state. A motor rotor 23 formed from a permanent magnet is incorporated into an outer peripheral surface of the motor shaft 22, and a motor stator 24 is incorporated into an inner peripheral surface of the motor housing 21.

The motor housing 21 comprises a cylindrical trunk section 21a and a rear plate 26 fixed to a rear end of the cylindrical trunk section 21a by a fastening bolt 25. A front plate component 21b is integrally formed on the front end section of the cylindrical trunk section 21a, projecting inwardly in an annular shape.

The motor shaft 22 disposed within the motor housing 21 is a hollow shaft; and comprises a large diameter hollow shaft section 22b in which a large diameter hollow section 22a is formed, and a small-diameter hollow shaft section 22d, which is integrally and concentrically formed from the rear end of the large diameter hollow shaft section 22b, and in which a small diameter hollow section 22c is formed. The front end outer peripheral surface component of the large diameter hollow shaft section 22b is supported in a rotatable state by the inner peripheral surface of the front plate component 21b of the cylindrical trunk section 21a, via a front-side motor bearing 27. The front end outer peripheral surface component of the small circumference hollow shaft section 22d is supported in a rotatable state by the inner peripheral surface of the rear plate 26, via a rear motor bearing 28.

The motor rotor 23 is incorporated into the outer peripheral surface component of the large diameter hollow shaft section 22b of the rear side of the frontal motor bearing 27. The motor stator 24 comprises a stator core 24a, which is attached to the inner peripheral surface of the cylindrical trunk section 21a of the motor housing 21, and a stator coil 24b, which is wrapped around the stator core 24a.

The small-diameter hollow shaft section 22d of the motor shaft 22 projects rearward from the rear plate 26 of the motor housing 21. The detecting section 4 is incorporated into the outer peripheral surface of the rearwardly projecting section on the small-diameter hollow shaft section 22d, in order to detect the rotating position, rotating speed, or other parameters of the motor shaft 22.

A cylindrical section 26a projects rearward from an outer peripheral edge of a rear end surface of the rear plate 26. A cylindrical detecting section housing 41 with the same outer diameter dimension as the cylindrical section 26a is connected and fixed to the rear end of the cylindrical section 26a. The rear end of the detecting section housing 41 is sealed using an end plate 42 in the shape of a truncated cone.

The ball screw/nut mechanism 3 disposed on the front side of the motor 2 comprises a ball screw shaft 31, which is connected and fixed to the motor shaft 22 in a coaxial state, and a ball nut 32. A ball screw 33 is formed on the outer peripheral surface of the ball screw shaft 31, and a hollow shaft 34 is connected and fixed in a coaxial state to the front end of the ball nut 32, which is screwed onto the ball screw 33.

The hollow shaft 34 is able to move along a central shaft line la of the actuator in a forward-backward direction, but is supported in a non-rotating state around the central shaft line 1a. Therefore, the ball nut 32 is also in the same state. Consequently, the ball nut 32 can be moved along the central shaft line 1a in a forward-backward direction by the rotation of the ball screw shaft 31 caused by the motor 2. Specifically, the hollow shaft 34 connected to the ball nut 32 can be moved in a forward-backward direction.

The ball screw shaft 31 comprises a main component 31a in which the ball screw 33 is formed, and a small diameter connection shaft component 31b extending rearward out from a rear end of the main component 31a in a coaxial state.

The connection shaft component 31b is inserted under pressure into the small diameter hollow section 22c of the small-diameter hollow shaft section 22d of the hollow motor shaft 22, and a rear end section 31c thereof projects rearward. A retainer 34 is fixed onto the rear end section 31c. A collar 35 is mounted between the main component 31a and the connection shaft component 31b. The collar 35 is disposed in a state of being held between a toric end surface 31d located between the connection shaft component 31b and the main component 31a, and a toric end surface 22e located between the small diameter hollow section 22c and the large diameter hollow section 22a of the motor 22. The connection shaft component 31b, which is formed integrally on the ball screw shaft 31, is thus connected and fixed to the motor shaft 22.

The rear end component of the main component 31a of the ball screw shaft 31 is positioned within the large diameter hollow section 22a of the motor shaft 22. The inner diameter of the large diameter hollow section 22a of the motor shaft 22 is larger than the outer diameter of the ball nut 32; therefore, the ball nut 32 is able to move inside the large diameter hollow section 22a, as shown in FIG. 1(A).

In the ball screw/nut type linear actuator 1 of the present example thus configured, the motor shaft 22 is a hollow shaft, and the ball screw shaft 31 is connected and fixed in a coaxial state to the motor shaft 22 inside the hollow section. Consequently, the shaft length of the actuator can be made shorter than when the motor shaft and the ball screw shaft are connected in series with a coupling therebetween. Furthermore, the weight of the actuator 1 can be reduced because the coupling can be omitted.

The large diameter hollow section 22a of the motor shaft 22 is a part of the range of movement of the ball nut 32. In other words, part of the locus of the movement of the ball nut 32 enters inside the motor; therefore, the range of movement of the ball nut 32 projecting forward from the motor shaft 22 can be shortened. The shaft length of the actuator 1 can thereby be reduced.

The ball screw shaft 31 is connected and fixed to the motor shaft 22 inside the hollow section of the motor shaft 22; therefore, the ball screw shaft 31 can be supported together with the motor shaft 22 by bearings 27, 28 of the motor 2. As a result, a support bearing for supporting the ball screw shaft 31 can be eliminated. Thus, a short and light actuator 1 is realized.

The invention claimed is:

1. A ball screw/linear actuator comprising:
a motor having a hollow shaft comprising a first hollow shaft section and a second hollow shaft section and
a ball screw/nut mechanism comprising a ball screw shaft comprising a main component in which a ball screw is formed and a connection shaft component integrally formed in a coaxial state on a rear end of the main component, the ball screw shaft being connected and fixed coaxially inside the motor hollow shaft, a ball nut of the ball screw/nut mechanism being held in a non-rotating state and able to move in a reciprocatory manner along the ball screw shaft as the ball screw rotates, a rear end section of the main component of the ball screw shaft being inserted coaxially in the first hollow shaft section of the motor, the connection shaft component of the ball screw shaft being inserted coaxially in the second hollow shaft section of the motor, an inside diameter of the first hollow shaft section being sufficient to allow the ball nut to move inside therein and serving as part of a moving passage of the ball nut and a connection shaft section of the ball screw shaft being connected and fixed to the second hollow shaft section.

2. The ball screw/nut type linear actuator of claim 1, characterized in that the connection shaft component of the ball screw shaft extends penetrating the second hollow shaft section of the motor shaft; and
   a retainer is fixed to a distal end of the connection shaft component protruding from a rear end of the second hollow shaft section.

3. The ball screw/nut type linear actuator of claim 1, characterized in comprising first and second bearings that support the motor shaft in a rotatable state; wherein
   the first bearing supports a front end section of the first hollow shaft section of the motor shaft in a rotatable state;
   the second bearing supports a front end section of the second hollow shaft section of the motor shaft in a rotatable state;
   a motor rotor is incorporated into an outer peripheral surface of the first hollow shaft section, which is positioned between the first and second bearings, and a motor stator is disposed in a state of surrounding the motor rotor.

4. The ball screw/nut type linear actuator of claim 3, characterized in that a rotary encoder for obtaining rotation information pertaining to the motor shaft is disposed on an outer peripheral surface region of the second hollow shaft section, which extends rearward from the second bearing.

* * * * *